Patented July 17, 1928.

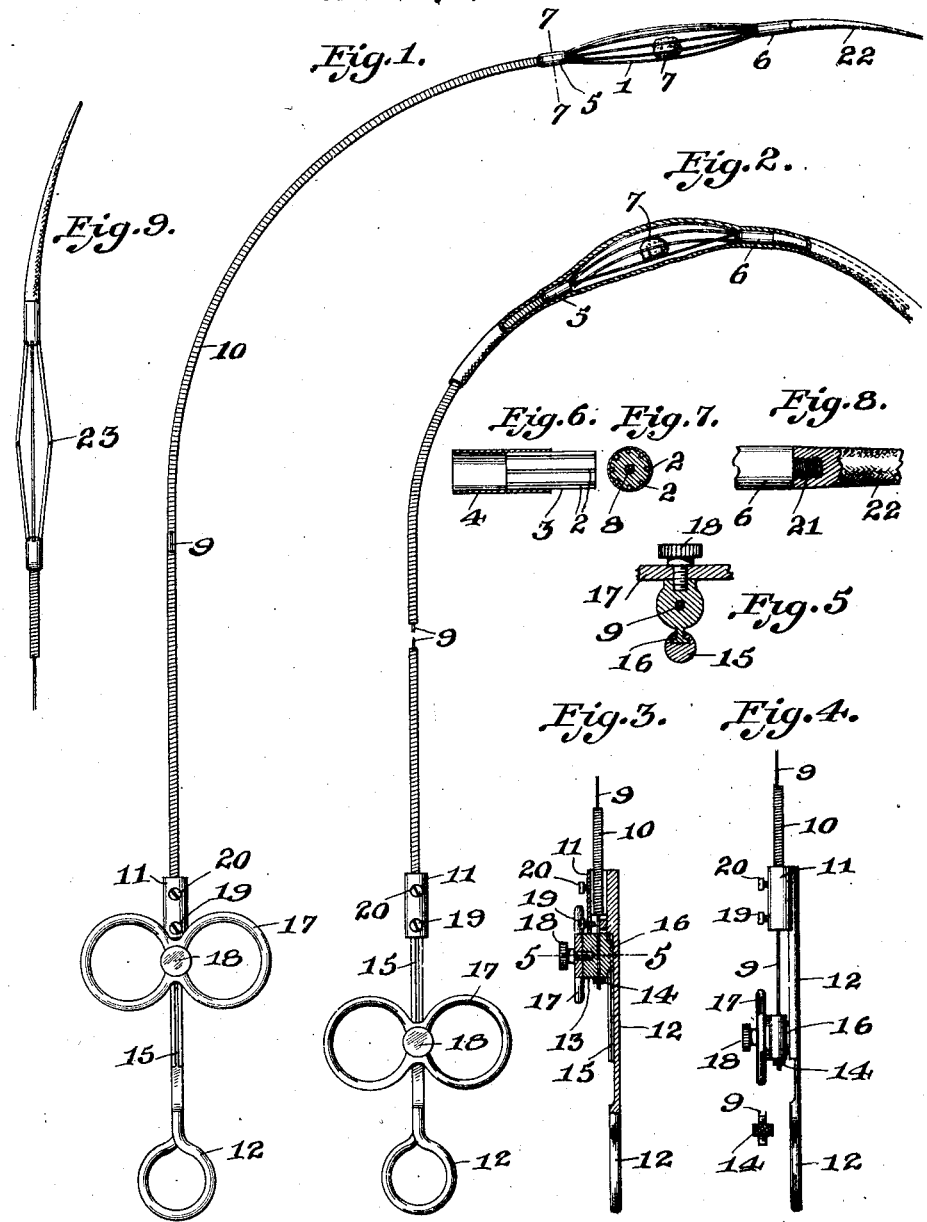

1,677,671

UNITED STATES PATENT OFFICE.

WILFORD A. COUNCILL, OF BALTIMORE, MARYLAND.

URETERAL STONE EXTRACTOR AND DILATOR.

Application filed July 2, 1926. Serial No. 120,177.

This invention relates to improvements in surgical instruments, particularly in an ureteral stone extractor and dilator, the instrument being adapted also for use in extractions from the urethra.

Other objects will appear from the following detailed descriptions and from the disclosure in the single sheet of drawings which is herewith made a part of this application:

In the drawings,

Fig. 1 illustrates a plan view of the extracting instrument in assembled form, showing a section broken away exposing the central pull wire, and also a stone within the trap, the tension on the pull wire having been entirely released.

Fig. 2 represents a plan view of the instrument with the pull wire under tension and the trap partly distended, disclosing the stone therein, sections being broken away to disclose the pull wire, and the body portion or canal into which the instrument is inserted.

Fig. 3 illustrates a vertical sectional view of the tension device, disclosing the finger holds, and means of anchoring the center pull wire in the device.

Fig. 4 represents a side elevational view of Fig. 3 in assembled form.

Fig. 5 illustrates a sectional plan view of Fig. 5 taken along lines 5—5 of Fig. 3.

Fig. 6 is a side view of the collar and trap wire holder, showing the collar in section disclosing the holder with grooved receptacles.

Fig. 7 represents a section view of the collar and holder taken along line 7—7 of Fig. 1.

Fig. 8 illustrates a side view of the tip, with a portion cut away showing method of attachment to the end collar and holder.

Fig. 9 represents a side view of the stone trap of a modified form over that disclosed in Figs. 1 and 2.

Numeral 1 designates a cage or trap composed of a suitable number of wire strands, the strands may be formed into the cage 1 by any suitable means or method as disclosed in Figures 6 and 7 whereby the strands of wire comprising the trap 1 adapted to receive the stone 7 of the spindle 3 in the general conformation of a hairpin shape, thereby eliminating the more or less remote possibility of causing damage by tearing of the body elements on removal of the stone and instrument.

After extending the wires composing the cage or trap through the grooves 2 in the spindle 3, a collar portion 4 is adapted to be closely fitted over the spindle and wire thereby holding firmly in place the ends of the wire strands composing the trap 1.

It is to be understood that the wire strands will be firmly held in place at each end thereof, as at 5 and 6 by means of a spindle 3, grooves 2 and collar 4 as above described.

Through the center of one of the spindles 3 adapted to receive in loose relationship therethrough, a central pull wire 9 adapted to be firmly fixed in the outer element 6 and extends in loose relationship through the trap or cage portion 1, the holding element 5 as at 8, and through the circular wire cable 10 which is adapted to conceal and protect the central pull wire 9.

The cable 10 adapted to carry in loose relationship therein, the pull wire 9 is suitably extended and held in a sleeve portion 11 integrally connected with the finger hold 12, the central pull wire 9 extending a suitable distance below the end of the enclosing cable portion 10 and held in adjustable relationship with finger hold tension device 13, the lower end of the central pull wire 9 being preferably threaded and supplied with a nut 14, thereby holding the wire 9 in adjustable relationship to the movable element 13 of the tension device.

Suitable guides 15 are integrally located along the inner shank of the finger hold portion 12, adapted to receive in slidable relationship thereto, guide portions 16 in the tension element 13. The finger holds 17 may be adjustably connected to the tension element 13 by means of a set screw 18 or otherwise. When under tension as disclosed in Fig. 2, the central wire may be clamped, if desired, in a set position by means of a set screw 19, while the circular wire cable 10 concealing the central pull wire 9, may be held in fixed position within the finger hold portion 12, by means of set screw 20.

The spindle portion adapted to receive the strands of wire for the cage 1 at the outer end 6 of the instrument may be properly supplied with a threaded tip 21, adapted to receive a suitably constructed tip portion 22, which tends to act as a guide for the instrument when in operation.

Fig. 9 is a modified form of the cage or trap 1, calling for a form of trap having hinged strands as at 23.

In operation this invention provides a surgical instrument particularly adapted as an ureteral stone extractor and dilator.

It may also be efficiently used in extractions from the urethra.

In operation of extracting, it is merely necessary to insert the instrument in the usual manner, and by means of finger tension exerted on the finger holds 12 and 17. Central pull wire 9 will tend to extend the cage or trap leaving a space between the strands of wire sufficient for taking in the stone or other matter to be removed. When this is accomplished, the tension on the finger holds is released and the instrument withdrawn carrying with it the stone.

In this invention, the central pull wire 9 not only acts as a means for extending the strands of the trap, but also is a material aid in holding the stone within the trap on removing the instrument during the operation.

What I claim is:

1. A surgical instrument for entrapping and extracting substances from a body, having an expansible portion consisting of a plurality of strands, operable means for expanding the portion for entrapping the substance, comprising a tension device consisting of a suitable gripping member, a pulling element extending from the gripping member through the expansible portion, one end of the pulling element being attached to the gripping member and the other end to the expansible portion.

2. A surgical instrument for entrapping and extracting substances from a body, having an expansible portion consisting of a plurality of strands, operable means for expanding the portion for entrapping the substance, comprising a tension device consisting of a suitable gripping member, a pulling element extending from the gripping member through the expansible portion, one end of the pulling element being attached to the gripping member and the other end to the expansible portion, tubular means for protecting and guiding the pulling element and gripping device, comprising a main body section above the gripping member, the tubular means being arranged in slidable relationship with the main body section.

3. A surgical instrument for entrapping and extracting substances from a body, having an expansible portion consisting of a plurality of strands, operable means for expanding the portion for entrapping the substance, comprising a tension device consisting of a suitable gripping member, a pulling element extending from the gripping member through the expansible portion, one end of the pulling element being attached to the gripping member and the other end to the expansible portion, tubular means for protecting and guiding the pulling element and gripping device, comprising a main body section above the gripping member, the tubular means being arranged in slidable relationship with the main body section, the attaching means of the pulling element to the expansible portion consisting of a suitable anchor element at the outer end of the expansible member.

4. A surgical instrument for entrapping and extracting substances from a body, having an expansible portion consisting of a plurality of strands, operable means for expanding the portion for entrapping the substance, comprising a tension device consisting of a suitable gripping member, a pulling element extending from the gripping member through the expansible portion, one end of the pulling element being attached to the gripping member and the other end to the expansible portion, tubular means for protecting and guiding the pulling element and gripping device, comprising a main body section above the gripping member, the tubular means being arranged in slidable relationship with the main body section, the attaching means of the pulling element to the expansible portion consisting of a suitable anchor element at the outer end of the expansible portion, the inner end of the expansible portion through which the pulling element is adapted to slidably extend consisting of an anchor section for the inner ends of the strands.

5. A surgical instrument for entrapping and exacting substances from a body, having an expansible portion consisting of a plurality of strands, operable means for expanding the portion for entrapping the substance, comprising a tension device consisting of a suitable gripping member, a pulling element extending from the gripping member through the expansible portion, one end of the pulling element being attached to the gripping member and the other end to the expansible portion, tubular means for protecting and guiding the pulling element and gripping device, comprising a main body section above the grippnig member, the tubular means being arranged in slidable relationship with the main body section, the attaching means of the pulling element to the expansible portion consisting of a suitable anchor at the outer end of the expansible portion, the inner end of the expansible portion through which the pulling element is adapted to slidably extend consisting of an anchor section for the inner ends of the strands, the last named anchor section being attached to a tubular means for protecting the pulling element, and means for covering the inner anchored ends of the expansible portion.

6. A surgical instrument for entrapping and exacting substances from a body, having an expansible portion consisting of a plurality of strands, operable means for expanding the portion for entrapping the substance, comprising a tension device consisting of a suitable gripping member, a pulling element extending from the gripping member through the expansible portion, one end of the pulling element being attached to the gripping member and the other end to the expansible portion, tubular means for protecting and guiding the pulling element and gripping device, comprising a main body section above the gripping member, the tubular means being arranged in slidable relationship with the main body section, the attaching means of the pulling element to the expansible portion consisting of a suitable anchor element at the outer end of the expansible portion, the inner end of the expansible portion through which the pulling element is adapted to slidably extend consisting of an anchor section for the inner ends of the strands, the last named anchor section being attached to a tubular means for protecting the pulling element, and means for covering the inner anchored ends of the expansible portion, consisting of a sleeve portion and adapted to slide over the anchor section and the inner ends of the strands, in such a manner that the strands will not inflict injury to the body portions when the instrument is being removed.

In testimony whereof I affix my signature.

WILFORD A. COUNCILL.